Dec. 23, 1969  E. VERSCHUUR  3,485,367
PROCESS AND APPARATUS FOR SEPARATING A MIXTURE CONSISTING
OF A VISCOUS LIQUID BEING IMMISCIBLE WITH WATER AS ONE
COMPONENT AND WATER AS THE OTHER COMPONENT
Filed Feb. 8, 1967  2 Sheets-Sheet 1

INVENTOR:
EKE VERSCHUUR
BY: *W.A.Marcontell*
HIS ATTORNEY

Dec. 23, 1969  E. VERSCHUUR  3,485,367
PROCESS AND APPARATUS FOR SEPARATING A MIXTURE CONSISTING
OF A VISCOUS LIQUID BEING IMMISCIBLE WITH WATER AS ONE
COMPONENT AND WATER AS THE OTHER COMPONENT
Filed Feb. 8, 1967  2 Sheets-Sheet 2

INVENTOR:
EKE VERSCHUUR
BY:
HIS ATTORNEY

United States Patent Office

3,485,367
Patented Dec. 23, 1969

3,485,367
PROCESS AND APPARATUS FOR SEPARATING A MIXTURE CONSISTING OF A VISCOUS LIQUID BEING IMMISCIBLE WITH WATER AS ONE COMPONENT AND WATER AS THE OTHER COMPONENT
Eke Verschuur, Amsterdam, Netherlands, assignor to Shell Oil Company, New York, N.Y., a corporation of Delaware
Filed Feb. 8, 1967, Ser. No. 614,633
Claims priority, application Netherlands, Feb. 8, 1966, 6601552
Int. Cl. B01d 17/02
U.S. Cl. 210—83     7 Claims

ABSTRACT OF THE DISCLOSURE

A method and apparatus for separating a mixture of water-immiscible viscous fluid and water by conducting the mixture in a flow stream onto a substantially imperforate, non-porous flat elevated surface having at least one side edge portion and front end portion flush with the plane of the surface. The mixture is conducted in the direction of the front end portion and the water in the mixture is gravitationally flowed over the side edge portion at a flow rate exceeding the natural flow rate of the viscous fluid in the mixture thereby causing the viscous fluid to be deposited on the surface substantially in the absence of the water. Finally, the deposited viscous fluid is removed from the surface by blowing a gas upwardly against the viscous fluid as it leaves the front end portion of the surface.

BACKGROUND OF THE INVENTION

Field of the invention

The invention relates to a process for separating a mixture of a viscous liquid being immiscible with water, such as a viscous oil, and water, which mixture flows out of a conduit such as a pipe, and to an apparatus suitable for carrying out that process.

Description of the prior art

A mixture of a viscous liquid with water is obtained, for instance, when oil is mixed with water for transport through a pipeline. The addition of the water brings about a flow pattern where the oil is present mainly in the center of the pipeline, the water forming a layer between the oil and the wall of the pipe. The pressure drop occurring during the flow is determined mainly by the water and is far less than the pressure difference that would occur should the oil be pumped without water. In this way it is even possible to transport oil at temperatures below the pour point, which is of importance, for instance, for oil with a high paraffin content and for residual oils.

With this manner of transport it is, in many cases, necessary to separate the water from the oil again, for instance, when the presence of water has a disturbing effect in the processing or the use of the oil. Likewise, in a booster pumping station, it may be necessary to separate the water and the oil and to bring the two phases to the desired pressure in separate pumps in order to prevent the formation of an emulsion.

Owing to the high viscosity of the oil and the small difference in density between oil and water, conventional methods of separation, such as settling, give rise to great difficulties, because the separation between the phases comes about very slowly, in consequence, large settling vessels. As an added consequence of separating oil and water mixtures by the settling tank method, there is a risk of the oil occluding considerable quantities of water during the process of separation. Improvement of the separation by raising the temperature is not attractive because this would involve high costs of heat and equipment for heat transfer.

SUMMARY OF THE INVENTION

The invention provides a method and process by which an effective separation of the water can be obtained in a simple manner and without raising the temperature. According to the invention, the mixture to be separated flows out of a pipe into a space, while the viscous liquid immediately upon the outflow is conducted, with the aid of a mechanical means, to a reservoir for viscous liquid, which means is so designed that the water is separated from the viscous liquid by the action of gravity.

The separation is based mainly on the difference in viscosity between the viscous liquid and water. While the viscous liquid, for instance, oil, is conducted to the reservoir with the aid of the mechanical means, owing to the low viscosity of the water, the movement thereof is determined mainly by the action of gravity. As the contribution to the movement of the water by the action of gravity is directed downwards, the water will flow away from the viscous liquid when that liquid is being conducted to the reservoir, whereupon the water may be caught separately.

The new process is suitable for any viscous oil, for oils at temperatures below the pour point, for thixotropic oils, bitumens, etc., because properties other than the viscosity play only a minor part or play no role at all. Good results may be obtained with an oil with a viscosity of 1000 cp.

DESCRIPTION OF THE PREFERRED EMBODIMENTS

Figure 1:
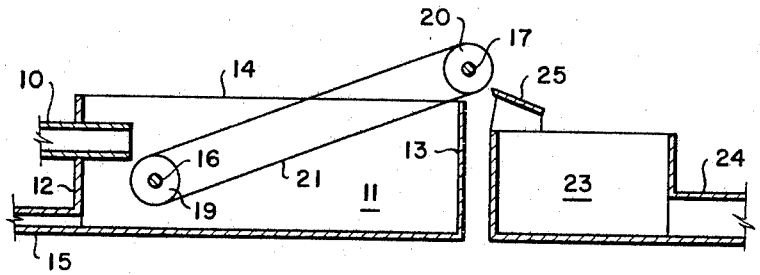
FIGURE 1 is an elevational cross-section view of one embodiment of the apparatus of the invention.

With reference to FIGURE 1, there is shown a mixture conductor pipe 10 passing through the end wall 12 of an open tank 11. The tank 11 also has an opposite end wall 13 and side walls 14. Near the bottom of the end wall 12 there is secured a water discharge conduit 15 which communicates with the interior volume of the tank 11.

Secured to the side walls 14 of the tank 11 are axle shafts 16 and 17 which are mounted for rotation by means of bearing blocks 18. Non-rotatively secured to the axle shafts are belt drums 19 and 20. The shaft 16 and respective drum 19 is mounted within the tank 11 between the walls 14 and approximately vertically below the end of mixture conductor pipe 10. Shaft 17 and respective drum 20 is mounted above the upper edge of the end wall 13. A conveyor belt 21 which may be of the conventional rubber impregnated fabric type, for example, is threaded over and between the drums 19 and 20.

A motor 22 or other rotating power means may be secured to axle shaft 16 depending on whether it is necessary to drive the conveyor belt 21 by means other than the mixture flow stream for reasons to be further explained hereinbelow.

Beyond the end wall 13 of tank 11, an oil accumulating tank 23 is provided having a discharge conduit 24. Tank 23 may be merely an extension of tank 21 with end wall 13 serving as a separator between the respective volumes thereof or a separate vessel structure as illustrated.

Between the drum 20 end of the conveyor and a vicinity above the tank 23 is provided a scraper 25. The blade edge of scraper 25 is disposed closely adjacent the surface of belt 21 as it passes over the drum 20, parallel with the axle shaft 17 and below a horizontal plane passing through the center of the axle shaft 17.

In operation, the mixture conductor 10 deposits a mixture of water-immiscible viscous fluid and water on the upper surface of conveyor belt 21. Due to the difference in elevation between the drums 19 and 20 and the resulting inclination of the conveyor belt surface with respect to horizontal, the respective fluids comprising the mixture will flow in divergent paths with the more viscous fluid adhering to the belt 21 and the water flowing downwardly along the belt 21 and off the sides thereof into the tank 11 to be carried away by discharge conduit 15. As for the viscous fluid that is left isolated by the less viscous water and deposited on the belt 21, it is carried along on the belt 21 to be removed therefrom with the aid of scraper 25. The scraper 25 may not be absolutely necessary in the case of a viscous fluid that is sufficiently stiff and cohesive as to peel off the belt under the influence of its own weight. However, the scraper 25 may be of importance to prevent a cumulative layer of viscous fluid from building on the belt 21 with a fluid which leaves a thin layer deposit on the belt after the bulk thereof has fallen off the belt 21 into the oil accumulating tank 23.

When the structural integrity of the viscous fluid is sufficiently great and the fluid is sufficiently stiff, a heavy crude oil below the pour point temperature, for example, so that the layer of fluid on the belt 21 will support a slight degree of compressive loading, it is possible to drive the belt 21 by the flow pressure force of the mixture conduit acting against the belt deposited viscous fluid layer. Consequently, no external power is needed to turn the drums 19 and 20 and move the belt 21 to raise the viscous fluid from the lower, depositing position to the upper, separating position.

On the other hand, should it be necessary to employ the force of an external power means, such as motor 22, to rotate the belt 21, it may be desirable to drive the belt 21 at a velocity independent of the velocity at which the mixture is supplied. In such cases, it may be advantageous for the speed of the conveyor belt 21 to be equal to or somewhat higher than the velocity of the viscous fluid flowing out of the pipe 10. It will then always be possible for the viscous fluid to be passed on immediately so that there will be no risk of it accumulating and consequently flowing over the side of the belt 21 into the water discharge tank 11 or otherwise hindering the separation flow of the water.

Another expedient which may be considered to contain the viscous fluid on the belt 21 as the water flows away from it is to give the belt a shallow gutter shape, assuming, of course, that the belt path is inclined as illustrated in FIGURE 1.

Figure 3:
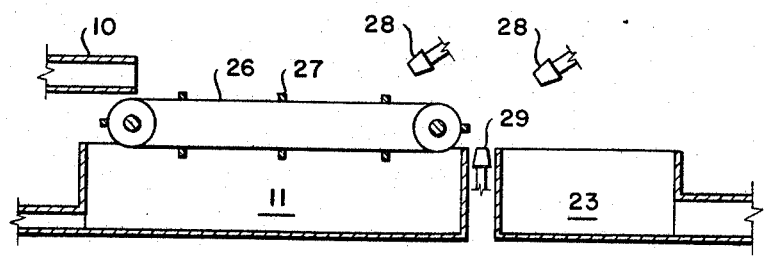
FIGURE 3 is an elevational cross-section view of a second embodiment of the invention.

If the immiscible fluid is less viscous and has a tendency to flow with the water, projections such as fences 27 on belt 26 in FIGURE 3 may be provided to augment the adhesion of the immiscible fluid to the belt. A roughened surface to the belt 26 will serve the same end. Although fences 27 may be used with the inclined belt of FIGURE 1 where the water flow is exclusively gravity induced and longitudinally opposite to the belt movement direction, separate water flow over the sides of the belt may be assisted by jet streams of gas such as air from nozzles 28 blowing on the mixture surface on the belt 26. Since scrapers such as 25 in FIGURE 1 may be inappropriate for the removal of viscous fluids on a belt having fences 26, a gas jet from nozzles 29 may be conveniently used for this purpose, also.

Figure 4:
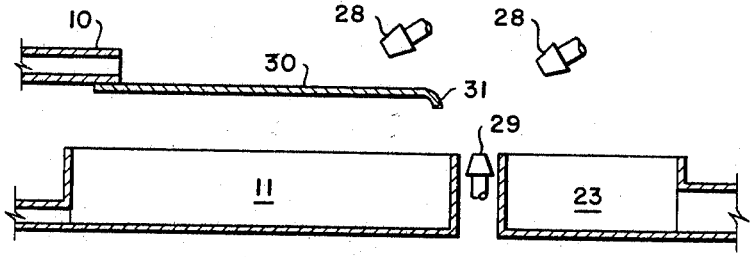
FIGURE 4 is an elevational cross-section view of a third embodiment of the invention.
Figure 5:
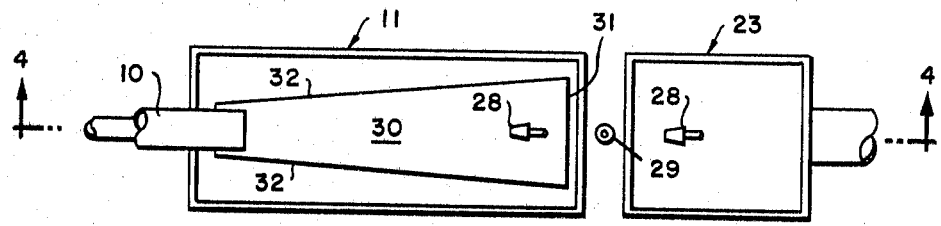
FIGURE 5 is a plan view of the invention apparatus illustrated in FIGURE 4.

When the viscous fluid deposited on the separation surface is such that the shape of the fluid changes only slightly when the water is being separated, it is possible for the viscous fluid to be conducted by a non-moving separation surface such as plate 30 in FIGURES 4 and 5. By this means there is gained the advantage the the process may be carried out with an apparatus of very simple construction and which has no moving parts.

Operatively, the viscous fluid flows to the reservoir 23 over the relatively small end perimeter 31 of the plate 30 while the water flows over the considerably large perimeter of the sides 32. As the shape of the viscous fluid does not change appreciably, the velocity of that fluid will remain substantially constant. The water, on the other hand, will spread over a larger area and its velocity will decrease. As a result, the viscous fluid flowing along and from the plate 30 will have a larger horizontal velocity component than has the water. Due to this velocity differential, the water is separated from the viscous fluid even if a portion of it flows from the plate surface over the end edge 31 along with the viscous fluid.

With viscous fluids that retain their shape after leaving the conduit 10 and when the water is being separated as described above, it is possible for the viscous fluid not to be supported between the plate surface 30 and the reservoir 23 over a distance which is at least equal to the thickness of the viscous fluid layer. In this case, which may occur, for instance, at temperatures below the pour point of an oil, the viscous fluid more or less retains the shape of a cylinder and touches the conducting surface by only a relatively smal area and, when leaving the conducting surface, still has a sufficiently large horizontal velocity component left. Where the oil is not supported, therefore, the water can escape along the entire perimeter thereof. Thus, no water is enclosed between the oil and the supporting surface and hence is not passed to the reservoir 23.

Figure 6:
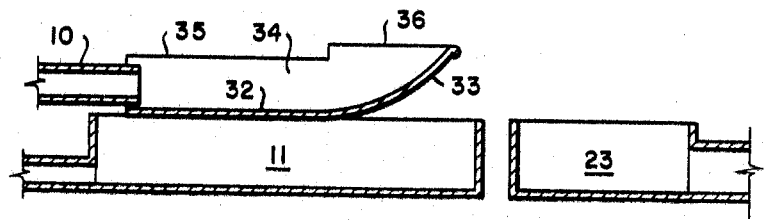
FIGURE 6 is an elevational cross-section view of a fourth embodiment of the invention.
Figure 7:
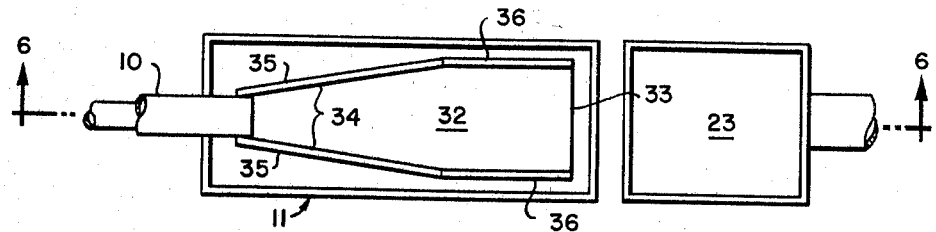
FIGURE 7 is a plan view of the invention apparatus illustrated in FIGURE 6.

In the apparatus of FIGURES 6 and 7, the plate 32a is provided with an upwardly curved end 33 and stepped side walls 34. The upper edge 35 of the side walls 34 nearest the mixture conductor pipe 10 is at a lower elevation than the upper edges 36 adjacent the curved end 33. The surfaces of the plate 32 is wetted by the water constituent of the mixture and provides an upward pressure on the viscous fluid with small flow resistance. In this way the viscous fluid is conducted to the higher elevation of the edges 33 and 36 and over the end 33 into the reservoir 23 while the water flows off over the greater periphery of lower edges 35 of the walls 34 into the reservoir 11.

The invention is further illustrated with the aid of the following examples.

EXAMPLE I

Figure 2:
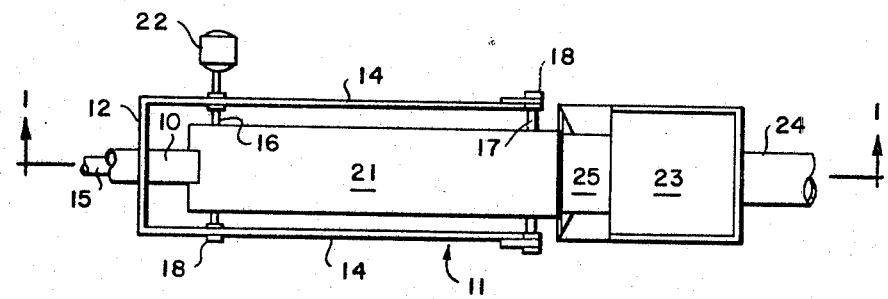
FIGURE 2 is a plan view of the invention apparatus illustrated in FIGURE 1.

A mixture of water and a heavy fuel oil which contained 12% waxy components and had a viscosity of approximately 3000 cp. at 25° C. was, at room temperature, supplied to an apparatus as shown in FIGURES 1 and 2. The diameter of the mixed conductor pipe 10 was 25 mm. The conveyor belt 21 was 400 mm. long and 70 mm. wide and had a slope of 20°. The speed of the belt 21 was equal to the velocity of the oil supplied. From a mixture with 30% water, an oil containing 1% water was obtained at a rate of supply of 0.17 meter per second. At a rate of supply of 0.44 meter per second, the water content after the separation was 3%. Starting from a mixture with 40% water, there was also obtained, at a rate of supply of 0.52 meter per second, an oil containing 3% water.

EXAMPLE II

In the same apparatus as that used in Example I, where however, the conveyor belt 21 was not provided with a scraper 25, a mixture was separated which contained a crude oil with 33% waxy components and with a pour point of 40° C. From a mixture with 30% water an oil containing 1% water was obtained at a rate of supply of 0.30 meter per second.

EXAMPLE III

A mixture of water and oil as used in Example II was separated in an apparatus as represented in FIGURES 5, 6 and 7. The diameter of the pipeline 10 was 32 mm. The accumulator formed by the plate 32 for conducting the oil and the side walls 34 had a length of 2000 mm. a width of 32 mm. on the side of the inflow and a width of 60 mm. on the side of the outflow. The smallest radius of curvature of the plate end 33 was 80 mm., the steepest slope relative to the horizontal plane was 45°. At a rate of inflow of 0.9 meter per second an oil containing 3.3% water was obtained.

What is claimed is:

1. A method for separating a mixture of water-immiscible viscous fluid and water comprising the steps of:
    providing a substantially non-porous, imperforate, flat, elevated surface having at least one side edge portion and a front end portion flush with the plane of said surface;
    conducting said mixture in a flow stream onto said surface in the direction of said front end portion;
    gravitationally flowing said water in said mixture over said side edge portion at a flow rate that exceeds the natural flow rate of said viscous fluid in said mixture, thereby causing said viscous fluid to be deposited on said surface substantially in the absence of said water; and
    removing said deposited viscous fluid from said surface at said front end portion by blowing a gas upwardly directly against said viscous fluid as it leaves the front end portion of said surface.

2. A method as described by claim 1 wherein said surface is a driven conveyor belt and including the step of driving said conveyor belt at a greater surface velocity than the discharge velocity of said flow stream onto said belt.

3. A method as described by claim 1 wherein said removal step includes scraping.

4. A method as described by claim 1 wherein the step of removing said viscous fluid includes flowing a viscous fluid having sufficient structural integrity to be pushed by the pressure of said flow stream along said surface and over an edge thereof.

5. A method as described by claim 1 comprising the step of blowing a gas onto said mixture on said surface to promote the separation of said viscous fluid and said water.

6. A method for separating a mixture comprising water-immiscible viscous fluid and water, said method comprising the following steps:
    conducting said mixture onto a substantially non-porous, imperforate horizontal surface having a front end portion and at least one side edge portion flush with said surface;
    releasing said mixture from the confining influence of containing walls along at least one portion of said surface;
    gravitationally flowing the water of said mixture over said side edge portion away from said surface at a flow rate that is greater than that of said viscous fluid, thereby causing said viscous fluid to deposit on said surface substantially in the absence of said water; and
    removing said deposited viscous fluid from said surface at said front end portion after said water has flowed away by blowing a gas upwardly directly against viscous fluid as it leaves the front end portion of said surface.

7. An apparatus for separating the constituents of mixtures comprising water-immiscible viscous fluid and water, said apparatus comprising:
    substantially non-porous, imperforate, flat, elevated, and elongated stationary plate surface means having at least one side edge portion and a front end portion that is substantially flush with the plane of said surface means;
    water and water-immiscible viscous fluid mixture conduit means disposed above at least the rear end portion of said surface means for discharging said mixture onto said surface means;
    viscous fluid removal means for removing the deposited viscous fluid constituent of said mixture from the front end portion of said surface means after the water constitutent of said mixture has flowed under the force of gravity over said edge portion, thereby depositing said viscous fluid substantially free of water on said surface means; and
    said front end portion of said surface means being curved upwardly and the rear end portion including said one edge portion, said surface means having side walls extending along the length thereof between said end portions, and said viscous fluid constituent having sufficient structural integrity to be pushed by the flow pressure thereof along the surface of said surface means and over the curved end thereof as said water constituent flows away from said viscous fluid constituent and over said one edge portion.

References Cited

UNITED STATES PATENTS

| | | | |
|---|---|---|---|
| 1,430,182 | 9/1922 | Peck | 210—70 X |
| 1,786,312 | 12/1930 | Newkirk | 210—23 |
| 1,873,597 | 8/1932 | Jones. | |
| 3,259,245 | 7/1966 | Earle | 210—73 |
| 3,314,540 | 4/1967 | Lane | 210—77 |
| 3,344,062 | 9/1967 | Kosar | 210—40 X |
| 3,358,834 | 12/1967 | El-Hinai | 210—73 |
| 973,697 | 10/1910 | Potts | 210—156 X |
| 1,702,612 | 2/1929 | Morse | 210—519 X |
| 3,144,409 | 8/1964 | Jauhola | 210—391 |

FOREIGN PATENTS

| | | |
|---|---|---|
| 867,469 | 5/1961 | Great Britain. |
| 990,847 | 5/1965 | Great Britain. |

REUBEN FRIEDMAN, Primary Examiner

JOHN W. ADEE, Assistant Examiner

U.S. Cl. X.R.

210—526, 532